United States Patent
Defoer et al.

(10) Patent No.: US 12,281,220 B2
(45) Date of Patent: *Apr. 22, 2025

(54) SOFT PROPYLENE COPOLYMER COMPOSITION

(71) Applicant: BOREALIS AG, Vienna (AT)

(72) Inventors: Johan Defoer, Beringen (BE); Marc Knaepen, Beringen (BE)

(73) Assignee: BOREALIS AG, Vienna (AT)

( * ) Notice: Subject to any disclaimer, the term of this patent is extended or adjusted under 35 U.S.C. 154(b) by 462 days.

This patent is subject to a terminal disclaimer.

(21) Appl. No.: 17/618,739

(22) PCT Filed: Jun. 15, 2020

(86) PCT No.: PCT/EP2020/066496
§ 371 (c)(1),
(2) Date: Dec. 13, 2021

(87) PCT Pub. No.: WO2021/004728
PCT Pub. Date: Jan. 14, 2021

(65) Prior Publication Data
US 2022/0251358 A1    Aug. 11, 2022

(30) Foreign Application Priority Data

Jul. 5, 2019   (EP) .................................. 19184754

(51) Int. Cl.
*C08L 23/14*   (2006.01)
*B32B 5/02*   (2006.01)
(Continued)

(52) U.S. Cl.
CPC ............ *C08L 23/142* (2013.01); *B32B 5/028* (2013.01); *B32B 27/08* (2013.01); *B32B 27/12* (2013.01);
(Continued)

(58) Field of Classification Search
CPC .......................... C08L 23/142; C08L 2207/02
See application file for complete search history.

(56) References Cited

U.S. PATENT DOCUMENTS 3,143,309 A   8/1964  Clarke
5,234,879 A   8/1993  Garoff et al.
(Continued)

FOREIGN PATENT DOCUMENTS

CN   104204074 A   12/2014
CN   109153829 A   1/2019
(Continued)

OTHER PUBLICATIONS

Applicant: Borealis AG; "Soft Propylene Copolymer Composition"; Chinese Application No. 202080043311.X; Chinese First Office Action dated Dec. 23, 2022; 14 pgs.
(Continued)

*Primary Examiner* — Catherine S Branch
(74) *Attorney, Agent, or Firm* — Tarolli, Sundheim, Covell & Tummino LLP

(57) ABSTRACT

The present invention relates to a propylene copolymer composition comprising (A) from 50.0 to 95.0 wt %, based on the total amount of the propylene copolymer composition, of a heterophasic propylene copolymer having a matrix phase and an elastomeric phase dispersed in said matrix phase, wherein the matrix phase is a propylene random copolymer, the heterophasic propylene copolymer further having a melt flow rate MFR2 of 0.2 to 12.0 g/10 min, determined according to ISO 1133 at a temperature of 230° C. and a load of 2.16 kg, and a xylene cold solubles (XCS) fraction in the range of from 20.0 to 50.0 wt % based on the total amount of the heterophasic propylene copolymer (A), determined according to ISO 16152 at a temperature of 25° C., and (B) from 5.0 to 25.0 wt %, based on the total amount of the propylene copolymer composition, of a propylene
(Continued)

based plastomer having a density in the range of from 845 to 870 kg/m³, determined according to ASTM D 1505 on compression moulded test specimens and a melt flow rate MFR2 of 1.0 to 30.0 g/10 min, determined according to ASTM D1238 at a temperature of 230° C. and a load of 2.16 kg, wherein the propylene copolymer composition has a tensile modulus of below 300 MPa, determined according to ISO 527-2, measured on injection moulded test specimens, and follows the following inequation: tensile modulus [MPa]<375 MPa−6×amount of (B) [MPa×wt %/wt %], an article comprising said propylene copolymer composition and the use of said propylene copolymer composition in a single ply roofing membrane.

15 Claims, 1 Drawing Sheet

(51) Int. Cl.
  *B32B 27/08* (2006.01)
  *B32B 27/12* (2006.01)
  *B32B 27/32* (2006.01)
(52) U.S. Cl.
  CPC .......... *B32B 27/32* (2013.01); *B32B 2274/00* (2013.01); *B32B 2307/72* (2013.01); *B32B 2419/06* (2013.01); *B32B 2605/08* (2013.01); *C08L 2203/162* (2013.01); *C08L 2205/035* (2013.01); *C08L 2207/02* (2013.01)

(56) References Cited

U.S. PATENT DOCUMENTS

| | | | |
|---|---|---|---|
| 5,272,236 | A | 12/1993 | Lai et al. |
| 2017/0368804 | A1* | 12/2017 | Mitchell ................. B32B 37/06 |

FOREIGN PATENT DOCUMENTS

| | | |
|---|---|---|
| EP | 0491566 A2 | 6/1992 |
| EP | 0586390 B1 | 5/1997 |
| EP | 0591224 B1 | 2/1998 |
| EP | 0887379 B1 | 12/1998 |
| EP | 1681315 A1 | 7/2006 |
| EP | 2316882 A1 | 5/2011 |
| WO | 92/12182 A1 | 7/1992 |
| WO | 1992/19653 A1 | 11/1992 |
| WO | 1992/19658 A1 | 11/1992 |
| WO | 199859002 A1 | 12/1998 |
| WO | 99/24478 A1 | 5/1999 |
| WO | 99/24479 A1 | 5/1999 |
| WO | 199933843 A1 | 7/1999 |
| WO | 00/68315 A1 | 11/2000 |
| WO | 2003/000754 A1 | 1/2003 |
| WO | 2003/000757 A1 | 1/2003 |
| WO | 2004/000899 A1 | 12/2003 |
| WO | 2004/111095 A1 | 12/2004 |
| WO | 2006/097497 A1 | 9/2006 |
| WO | 2011/076780 A1 | 6/2011 |
| WO | 2013007650 A1 | 1/2013 |
| WO | 2013092620 A1 | 6/2013 |
| WO | 2015091839 A1 | 6/2015 |
| WO | 2016162359 A1 | 10/2016 |
| WO | 2017198633 A1 | 11/2017 |

OTHER PUBLICATIONS

Applicant: Borealis AG; "Soft Propylene Copolymer Composition"; Canadian Application No. 3,143,387; Canadian Examiner's Report dated Dec. 15, 2022; 4 pgs.
Applicant: Borealis AG; "Soft Propylene Copolymer Composition"; International PCT Application No. PCT/EP2020/066496; International PCT Information Disclosure Statement and Written Opinion; Authorized Officer: Sigrid Lippert; Aug. 18, 2020; 13 pgs.
Applicant: Borealis AG; "Soft Propylene Copolymer Composition"; European Application No. EP19184754; Extended European Search Report; Authorized Officer: Sigrid Lippert; Dec. 11, 2019; 7 pgs.
Busico, V., Carbonniere, P., Cipullo, R., Pellecchia, R., Severn, J., Talarico, G., Macromol. Rapid Commun. 2007, 28, 1128.
Busico, V., Cipullo, R., Monaco, G., Vacatello, M., Segre, A.L., Macromolecules 30 (1997) 6251.
Busico, V., Cipullo, R., Prog. Polym. Sci. 26 (2001) 443.
Cheng, H. N., Macromolecules 17 (1984), 1950.
Kakugo, M., Naito, Y., Mizunuma, K., Miyatake, T. Macromolecules 15 (1982) 1150.
Randall, J. Macromol. Sci., Rev. Macromol. Chem. Phys. 1989, C29, 201.
Resconi, L., Cavallo, L., Fait, A., Piemontesi, F., Chem. Rev. 2000, 100, 1253.
Singh, G., Kothari, A., Gupta, V., Polymer Testing 28 5 (2009), 475.
Wang, W-J., Zhu, S., Macromolecules 33 (2000), 1157.
Zhou, Z., Kuemmerle, R., Qiu, X., Redwine, D., Cong, R., Taha, A., Baugh, D. Winniford, B., J. Mag. Reson. 187 (2007) 225.
Hans Zweifel, Plastic Additives Handbook, 6th edition, 2009, pp. 1141-1190.
Heino, E.L., et al.; "Rheological characterization of polyethylene fractions"; Neste Oy, Porvoo, Finland, Theor. Appl. Rheol., Proc. Int. Congr. Rheol, 11th (1992), 1, 360-362.
Heino, E.L.; "The influence of molecular structure on some rheological properties of polyethylene", Borealis Polymers Oy, Porvoo, Finland, Annual Transactions of the Nordic Rheology Society, 1995.
Wilhelm, Manfred. "Fourier-transform rheology." Macromolecular materials and engineering 287.2 (2002): 83-105.
Zatloukal, Martin. "Novel Trends in Rheology III: Proceedings of the International Conference." American Institute of Physics Conference Series. vol. 1152. 2009.
Filipe, S., K. Klimke, and A. T. Tran. "Non-linear rheological parameters for characterization of molecular structural properties in polyolefins." Proceedings of Annual European Rheology Conference, Gotenburg, Sweden. 2010.
Dealy, John M., and Kurt F. Wissbrun. Melt rheology and its role in plastics processing: theory and applications. Springer Science & Business Media, 2012.
Filipe, Susana, et al. "High Throughput Experimentation: Novel Non-linear Rheological Parameters for Quality Control." AIP Conference Proceedings. vol. 1375. No. 1. American Institute of Physics, 2011.
Kaye, A., et al. "Definition of terms relating to the non-ultimate mechanical properties of polymers (recommendations 1998)." Pure and applied chemistry 70.3 (1998): 701-754.
Annual European Rheology Conference—Book of Abstracts; Apr. 7-9, 2010, Sweden; pp. 1-317.

* cited by examiner

SOFT PROPYLENE COPOLYMER COMPOSITION

The present invention relates to a propylene copolymer composition with a tensile modulus of below 300 MPa comprising a heterophasic propylene copolymer and a propylene based plastomer, an article comprising said propylene copolymer composition and the use of said propylene copolymer composition in a single ply roofing membrane.

BACKGROUND OF THE INVENTION

Soft polymeric materials such as thermoplastic polyolefins (TPO), polyvinyl chloride (PVC) or ethylene propylene diene methylene rubbers (EPDM) are generally used for upholstery applications e.g. in automotive applications or single ply roofing.

These materials generally can be categorized into two groups—thermosets and thermoplastics.

Thermosets such as e.g. EPDM show long-term weathering ability and good performance when subjected to fluctuations in temperature, UV light, and ozone.

Their drawback is that they cannot be sealed so that for upholstery applications EPDM needs to be stitched and for singly ply roofing EPDM needs to be glued with a bitumen modified rubber kit.

As thermoplastics usually Ziegler-Natta catalysed polypropylene resins, metallocene catalysed polypropylene resins, metallocene catalysed ethylene copolymer resins or heterophasic propylene copolymers with a random copolymer matrix phase (RAHECOs) with a low stiffness in form of a low tensile modulus are used for the above described applications. As thermoplastics these resins can be sealed contrary to thermosets.

Ziegler-Natta catalysed polypropylene resins have the drawback of a high oligomer content, which causes fogging and high volatile organic compounds (VOC) values. On the positive side, these resins show comparatively high melting temperatures at a low stiffness shown by a tensile modulus of less than 200 MPa.

Metallocene catalysed polypropylene resins on the other hand show a low melting temperature due to the absence of higher molecular weight fractions and syndiotactic polymerization effects of the metallocene catalyst. On the positive side, these resins show low oligomer migration and consequently low fogging and high volatile organic compounds (VOC) values, and a good sealing behaviour. RAHECOs have the drawback of oligomer migration, which causes fogging and high volatile organic compounds (VOC) values. Additionally oligomer migration impairs adhesion and sealing properties of the thermoplastic resins.

In order to improve the impact properties of RAHECOs it is known to add ethylene based plastomers, which are known to have goods sealing properties due to a low zero shear viscosity. It has however been found that the sealing performance of the blends of the RAHECOs with the plastomers do not improve the sealing properties. Additionally, these compositions of soft RAHECOs and ethylene based plastomers do not provide sufficient improvement of the oligo migration, sealing properties or softness.

Thus, there is a need in the art for thermoplastic polymer compositions, which show an increased softness, especially for upholstery applications and singly ply roofing.

It has surprisingly been found that a propylene copolymer composition comprising a heterophasic propylene copolymer with a propylene random copolymer matrix phase as main component, to which at least a propylene based plastomer and optionally an ethylene based plastomer are added, shows such an increased softness in form of a surprisingly low tensile modulus and thus is especially suitable for upholstery applications and singly ply roofing.

SUMMARY OF THE INVENTION

The present invention relates to a propylene copolymer composition comprising
(A) from 50.0 to 95.0 wt %, based on the total amount of the propylene copolymer composition, of a heterophasic propylene copolymer having a matrix phase and an elastomeric phase dispersed in said matrix phase, wherein the matrix phase is a propylene random copolymer,
the heterophasic propylene copolymer further having a melt flow rate $MFR_2$ of 0.2 to 12.0 g/10 min, determined according to ISO 1133 at a temperature of 230° C. and a load of 2.16 kg, and
a xylene cold solubles (XCS) fraction in the range of from 20.0 to 50.0 wt % based on the total amount of the heterophasic propylene copolymer (A), determined according to ISO 16152 at a temperature of 25° C., and
(B) from 5.0 to 25.0 wt %, based on the total amount of the propylene copolymer composition, of a propylene based plastomer having a density in the range of from 845 to 870 $kg/m^3$, determined according to ASTM D1505 on compression moulded test specimens and a melt flow rate $MFR_2$ of 1.0 to 30.0 g/10 min, determined according to ASTM D1238 at a temperature of 230° C. and a load of 2.16 kg,
wherein the propylene copolymer composition has a tensile modulus of below 300 MPa, determined according to ISO 527-2, measured on injection moulded test specimens, and follows the following inequation:

tensile modulus [MPa]<375 MPa−6×amount of (B) [MPa×wt %/wt %].

Further, the present invention relates to an article comprising the propylene copolymer composition as defined above or below.

Still further, the present invention relates to the use of the propylene copolymer composition as defined above or below for the production of an article, such as the use of the propylene copolymer composition as defined above or below in a single ply roofing membrane.

Definitions

A propylene copolymer composition denotes a polymer composition with a molar majority of propylene copolymer(s).

A heterophasic polypropylene is a propylene-based copolymer with a crystalline matrix phase, which can be a propylene homopolymer or a random copolymer of propylene and at least one alpha-olefin comonomer, and an elastomeric phase dispersed therein. The elastomeric phase can be a propylene copolymer with a high amount of comonomer which is not randomly distributed in the polymer chain but are distributed in a comonomer-rich block structure and a propylene-rich block structure.

A heterophasic polypropylene usually differentiates from a one-phasic propylene copolymer in that it shows two distinct glass transition temperatures Tg which are attributed to the matrix phase and the elastomeric phase.

A propylene homopolymer is a polymer which essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units.

A propylene random copolymer is a copolymer of propylene monomer units and comonomer units in which the comonomer units are distributed randomly over the polypropylene chain. Thereby, a propylene random copolymer includes a fraction, which is insoluble in xylene—xylene cold insoluble (XCU) fraction—in an amount of at least 70 wt %, more preferably of at least 80 wt %, still more preferably of at least 85 wt %, most preferably of at least 88 wt %, based on the total amount of propylene random copolymer. Accordingly, the propylene random copolymer does not contain an elastomeric polymer phase dispersed therein.

A plastomer is a polymer which combines the qualities of elastomers and plastics, such as rubber-like properties with the processing abilities of plastic.

An ethylene based plastomer is a plastomer with a molar majority of ethylene monomer units.

An propylene based plastomer is a plastomer with a molar majority of propylene monomer units.

Usually, a propylene polymer comprising at least two propylene polymer fractions (components), which have been produced under different polymerization conditions resulting in different (weight average) molecular weights and/or different comonomer contents for the fractions, preferably produced by polymerizing in multiple polymerization stages with different polymerization conditions, is referred to as "multimodal". The prefix "multi" relates to the number of different polymer fractions the propylene polymer is consisting of. As an example of multimodal propylene polymer, a propylene polymer consisting of two fractions only is called "bimodal", whereas a propylene polymer consisting of three fractions only is called "trimodal".

A unimodal propylene polymer only consists of one fraction.

Thereby, the term "different" means that the propylene polymer fractions differ from each other in at least one property, preferably in the weight average molecular weight—which can also be measured in different melt flow rates of the fractions—or comonomer content or both.

In the following amounts are given in % by weight (wt %) unless it is stated otherwise.

Figure 1:
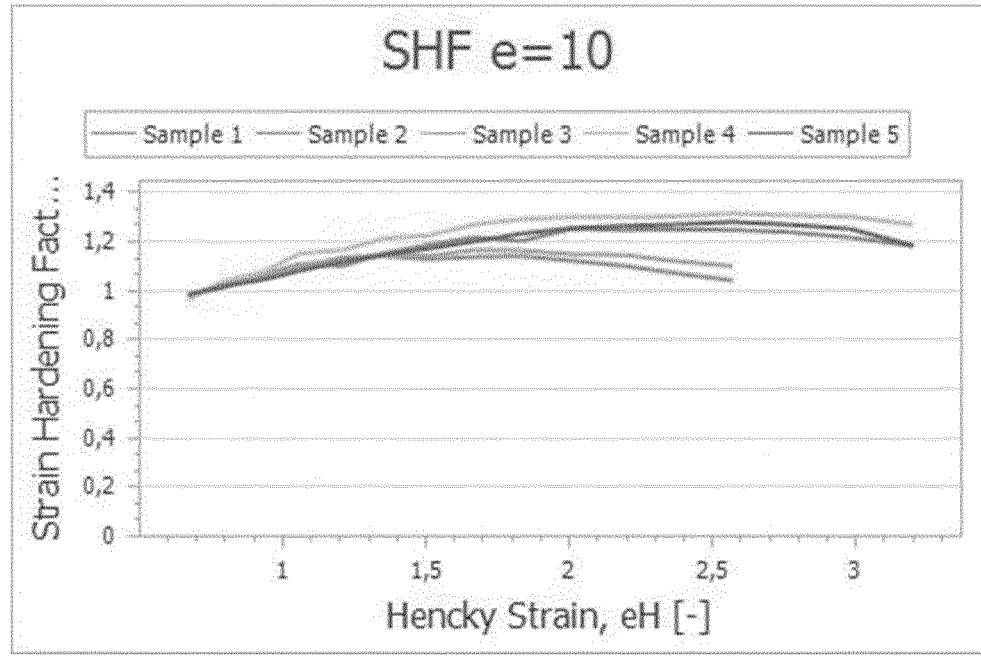
FIG. 1 shows the behaviour of the strain hardening factor at a strain rate of 10.0 s$^{-1}$ (SHF e10) for Hencky strains in the range of about 0.5 to about 3.5.
Figure 2:
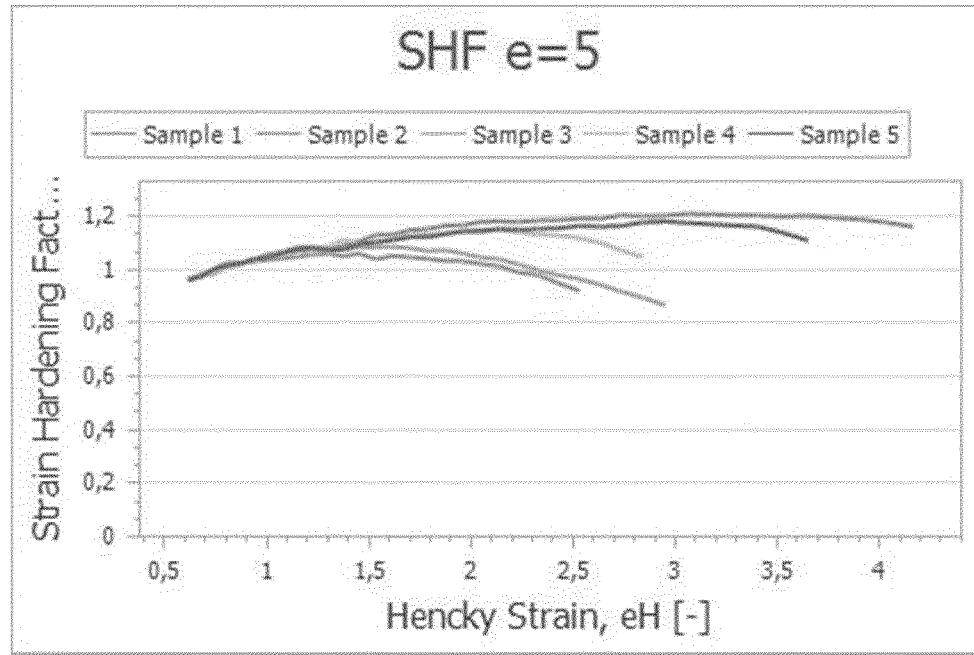
FIG. 2 shows the behaviour of the strain hardening factor at a strain rate of 5.0 s$^{-1}$ (SHF e5) for Hencky strains in the range of about 0.5 to about 4.5.

Thereby, in FIGS. 1 and 2 sample 1 represents IE12, sample 2 represents Ref1, sample 3 represents HIFAX CA 10 A, commercially available from LyondellBasell, sample 4 represents CE5 and sample 5 represents IE11.

DETAILED DESCRIPTION

Propylene Copolymer Composition

The propylene copolymer composition according to the present invention comprises a heterophasic propylene copolymer (A) having a matrix phase and an elastomeric phase dispersed in said matrix phase, wherein the matrix phase is a propylene random copolymer, and a propylene based plastomer (B).

The propylene copolymer composition comprises the heterophasic propylene copolymer (A) in an amount of from 50.0 to 95.0 wt %, preferably from 55.0 to 90.0 wt %, more preferably from 57.0 to 85.0 wt % and most preferably from 60.0 to 80.0 wt %, based on the total amount of the propylene copolymer composition.

The propylene copolymer composition comprises the propylene based plastomer (B) in an amount of from 5.0 to 25.0 wt %, preferably from 10.0 to 23.0 wt %, more preferably from 12.0 to 22.0 wt % and most preferably from 15.0 to 20.0 wt %, based on the total amount of the propylene copolymer composition.

The propylene copolymer composition can further comprise an ethylene based plastomer (C).

The propylene copolymer composition preferably comprises the ethylene based plastomer (C), if present, in an amount of from 5.0 to 25.0 wt %, preferably from 10.0 to 23.0 wt %, more preferably from 12.0 to 22.0 wt % and most preferably from 15.0 to 20.0 wt %, based on the total amount of the propylene copolymer composition.

The propylene copolymer composition can further comprise a propylene based plastomer (D) which differs from propylene based plastomer (B) in a higher density.

The propylene copolymer composition preferably comprises the propylene based plastomer (D), if present, in an amount of from 0.5 to 5.0 wt %, preferably from 1.0 to 4.5 wt %, more preferably from 1.5 to 4.0 wt % and most preferably from 2.0 to 3.5 wt %, based on the total amount of the propylene copolymer composition. The propylene copolymer composition can further comprise polymeric components which are different from components (A), (B) and optionally (C) and (D) in an amount of preferably 0.0 to 10.0 wt % based on the total amount of the propylene copolymer composition.

It is however preferred that the polymeric components of the propylene copolymer composition consist of components (A), (B) and optionally (C) and (D).

Besides these polymeric components the propylene copolymer composition can comprise one or more additives in an amount of from 0.0 up to 5.0 wt %, based on the total amount of the propylene copolymer composition. The one or more additives are selected from slip agents, anti-block agents, UV stabilizers, acid scavengers, antioxidants, alpha- and/or beta nucleating agents, antistatic agents, pigments, etc. Such additives are commercially available and for example described in "Plastic Additives Handbook", 6$^{th}$ edition 2009 of Hans Zweifel (pages 1141 to 1190).

Usually, these additives are added in quantities of 100 to 2,000 ppm for each single component.

The one or more additives can be added to the polymeric components in a blending step.

Thereby, the one or more additives can be added to the polymeric components in form of master batches in which one or more additives are blended with a carrier polymer in concentrated amounts. Any optional carrier polymer is calculated to the amount of additives, based on the total amount of the propylene copolymer composition.

In one embodiment the propylene copolymer compositions consists of components (A), (B) and optional additives. In said embodiment the amounts of components (A), (B) and optional additives add up to 100 wt %, based on the total amount of the propylene copolymer composition.

In one embodiment the propylene copolymer compositions consists of components (A), (B), (C) and optional additives. In said embodiment the amounts of components (A), (B), (C) and optional additives add up to 100 wt %, based on the total amount of the propylene copolymer composition.

In one embodiment the propylene copolymer compositions consists of components (A), (B), (C), (D) and optional additives. In said embodiment the amounts of components (A), (B), (C), (D) and optional additives add up to 100 wt %, based on the total amount of the propylene copolymer composition.

The propylene copolymer composition shows a surprisingly low tensile modulus.

The propylene copolymer composition has a tensile modulus of below 300 MPa, preferably not more than 275 MPa, more preferably of not more than 250 MPa, still more preferably not more than 225 MPa and most preferably of not more than 200 MPa, determined according to ISO 527-2 measured on injection moulded test specimens.

The lower limit of the tensile modulus is usually not lower than 50 MPa, more preferably not lower than 75 MPa.

Thus, the propylene copolymer composition preferably has a tensile modulus in the range of from 50 to below 300 MPa, more preferably in the range of from 75 to 275 MPa.

It has been found in the present invention that the softness of the propylene copolymer composition depends on the amount of the propylene based plastomer (B) in the composition. With increasing amount of plastomer (B) a lower tensile modulus is obtained.

The propylene copolymer composition of the invention follows the following inequation:

tensile modulus [MPa]<375 MPa−6×amount of (B) [MPa×wt %/wt %]

Preferably, the propylene copolymer composition of the invention follows the following inequation:

tensile modulus [MPa]<360 MPa−6×amount of (B) [MPa×wt %/wt %]

More preferably, the propylene copolymer composition of the invention follows the following inequation:

tensile modulus [MPa]<350 MPa−6×amount of (B) [MPa×wt %/wt %]

Most preferably, the propylene copolymer composition of the invention follows the following inequation:

tensile modulus [MPa]<325 MPa−6×amount of (B) [MPa×wt %/wt %]

The propylene copolymer composition preferably has a melt flow rate $MFR_2$ of from 0.3 to 10.0 g/10 min, more preferably of from 1.0 to 8.5 g/10 min, still more preferably of from 1.5 to 6.5 g/10 min and most preferably of from 2.0 to 5.5 g/10 min, determined according to ISO 1133 at a temperature of 230° C. and a load of 2.16 kg.

An additional measure to decrease the tensile modulus of the propylene copolymer composition of the invention is to introduce the ethylene based plastomer (C) as defined above or below to the composition.

It has surprisingly been found that the propylene based plastomer (B) and the ethylene based plastomer (C) have a synergistic effect on the tensile modulus of the propylene copolymer composition.

It has additionally been found that the propylene copolymer composition comprising the propylene based plastomer (B) and the ethylene based plastomer (C) shows an improved balance of properties as regards to high softness as shown in its low tensile properties, improved impact properties, as shown in its improved Charpy notched impact properties especially at low and very low temperatures, low fogging as shown in its low total carbon emission and fogging gravimetric, improved non-linear viscoelastic behaviour as shown in the Large Oscillatory Shear (LAOS) measurement and favourable melt strength as shown in the strain hardening factor (SHF), The propylene copolymer composition shows a high softness as can be seen from the above defined tensile modulus and the below defined preferred tensile properties:

The propylene copolymer composition, preferably the propylene copolymer composition comprising components (A), (B), (C) and optionally (D), preferably has a tensile stress at yield of not more than 15.0 MPa, more preferably not more than 12.5 MPa, still more preferably not more than 11.0 MPa and most preferably not more than 10.0 MPa, determined according to ISO 527-2 measured on injection moulded test specimens.

The lower limit of the tensile stress at yield is usually not lower than 2.5 MPa, more preferably not lower than 3.5 MPa.

Still further, the propylene copolymer composition preferably has a tensile stress at break of not more than 25.0 MPa, more preferably not more than 22.5 MPa, still more preferably not more than 20.0 MPa and most preferably not more than 18.0 MPa, determined according to ISO 527-2 measured on injection moulded test specimens.

The lower limit of the tensile stress at break is usually not lower than 3.0 MPa, more preferably not lower than 4.0 MPa.

Further, the propylene copolymer composition preferably has a tensile strain at yield of at least 15.0%, more preferably at least 20.0%, still more preferably at least 25.0% and most preferably at least 30.0%, determined according to ISO 527-2 measured on injection moulded test specimens.

The upper limit of the tensile strain at yield is usually not higher than 100% more preferably not higher than 85.0%.

Further, the propylene copolymer composition preferably has a tensile strain at break of at least 250%, more preferably at least 300%, still more preferably at least 325% and most preferably at least 350%, determined according to ISO 527-2 measured on injection moulded test specimens.

The upper limit of the tensile strain at break is usually not higher than 1000%, more preferably not higher than 850%.

Still further, the propylene copolymer composition has a flexural modulus of not more than 350 MPa, more preferably not more than 300 MPa, still more preferably of not more than 250 MPa and most preferably of not more than 200 MPa, determined according to ISO 178 measured on injection moulded test specimens.

The lower limit of the flexural modulus is usually not lower than 50 MPa, more preferably not lower than 75 MPa.

Thus, the propylene copolymer composition preferably has a flexural modulus in the range of from 50 to 350 MPa, more preferably in the range of from 75 to 300 MPa.

At higher temperatures of 80° C. the propylene copolymer composition preferably has the following tensile properties:

Preferably the propylene copolymer composition has a tensile modulus of not more than 75 MPa, more preferably not more than 70 MPa, still more preferably of not more than 60 MPa and most preferably of not more than 50 MPa, determined according to ISO 527-2 measured on injection moulded test specimens at a temperature of 80° C.

The lower limit of the tensile modulus is usually not lower than 15 MPa, more preferably not lower than 20 MPa.

Thus, the propylene copolymer composition preferably has a tensile modulus at 80° C. in the range of from 15 to 75 MPa, more preferably in the range of from 20 to 70 MPa.

Further, the propylene copolymer composition preferably has a tensile stress at yield of not more than 5.0 MPa, more preferably not more than 3.5 MPa, still more preferably not more than 3.0 MPa and most preferably not more than 2.5 MPa, determined according to ISO 527-2 measured on injection moulded test specimens at a temperature of 80° C.

The lower limit of the tensile stress at yield is usually not lower than 0.5 MPa, more preferably not lower than 1.0 MPa.

Still further, the propylene copolymer composition preferably has a tensile stress at break of not more than 5.0 MPa, more preferably not more than 3.5 MPa, still more preferably not more than 3.0 MPa and most preferably not more than 2.5 MPa, determined according to ISO 527-2 measured on injection moulded test specimens at a temperature of 80° C.

The lower limit of the tensile strength is usually not lower than 0.5 MPa, more preferably not lower than 1.0 MPa.

Further, the propylene copolymer composition preferably has a tensile strain at yield of at least 25.0%, more preferably at least 30.0%, still more preferably at least 35.0% and most preferably at least 40.0%, determined according to ISO 527-2 measured on injection moulded test specimens at a temperature of 80° C. The upper limit of the tensile strain at yield is usually not higher than 100% more preferably not higher than 90.0%.

Further, the propylene copolymer composition preferably has a tensile strain at break of at least 25.0%, more preferably at least 30.0%, still more preferably at least 35.0% and most preferably at least 40.0%, determined according to ISO 527-2 measured on injection moulded test specimens at a temperature of 80° C. The upper limit of the tensile strain at tensile strength is usually not higher than 100%, more preferably not higher than 90.0%.

The propylene copolymer composition, preferably the propylene copolymer composition comprising components (A), (B), (C) and optionally (D), further shows improved impact properties as can be seen in below preferred Charpy notched strength values:

The propylene copolymer composition preferably has a Charpy notched impact strength (−20° C.) of at least 50 kJ/m$^2$, more preferably of at least 55 kJ/m$^2$, still preferably of at least 60 kJ/m$^2$ and most preferably of at least 65 kJ/m$^2$, determined according to ISO 179/1eA at −20° C.

As upper limit, the propylene copolymer composition preferably does not break in the Charpy notched impact strength test at −20° C.

The propylene copolymer composition preferably has a Charpy notched impact strength (−30° C.) of at least 2.5 kJ/m$^2$, more preferably of at least 3.0 kJ/m$^2$, still more preferably of at least 3.5 kJ/m$^2$, determined according to ISO 179/1eA at −30° C.

As upper limit, the propylene copolymer composition preferably does not break in the Charpy notched impact strength test at −30° C.

The propylene copolymer composition preferably has a Charpy notched impact strength (−40° C.) of at least 1.9 kJ/m$^2$, more preferably of at least 2.0 kJ/m$^2$, still more preferably of at least 2.1 kJ/m$^2$ and most preferably of at least 2.2 kJ/m$^2$, determined according to ISO 179/1eA at −40° C.

As upper limit, the propylene copolymer composition preferably has a Charpy notched impact strength at −40° C. of not more than 6.0 kJ/m$^2$, more preferably of not more than 5.0 kJ/m$^2$.

Thus, the propylene copolymer composition preferably has a Charpy notched impact strength (−40° C.) in the range of from 1.9 to 6.0 kJ/m$^2$, more preferably in the range of from 2.0 to 5.0 kJ/m$^2$.

The propylene copolymer composition, preferably the propylene copolymer composition comprising components (A), (B), (C) and optionally (D), further shows low fogging properties as can be seen in below preferred values:

The propylene copolymer composition preferably has a fogging gravimetric of not more than 0.15 mg, more preferably not more than 0.12 mg, still more preferably not more than 0.10 mg and most preferably not more than 0.07 mg, determined according to DIN 75201:2011-1 method B.

As lower limit, the propylene copolymer composition preferably does not show any measurable fogging gravimetric at all (i.e. a measurable value of 0.00 mg), more preferably has a fogging gravimetric of at most 0.02 mg.

Thus, the propylene copolymer composition preferably has a fogging gravimetric in the range of from 0.00 to 0.15 mg, more preferably in the range of from 0.02 to 0.12 mg.

Still further, the propylene copolymer composition preferably has a total carbon emission of not more than 75 µgC/g, more preferably not more than 65 µgC/g, still more preferably not more than 60 µgC/g and most preferably not more than 50 µgC/g.

As lower limit, the propylene copolymer composition preferably does not show any measurable total carbon emission (i.e. a measurable value of 0.00 µgC/g), more preferably has a total carbon emission of at most 10 µgC/g, still more preferably of at most 20 µgC/g.

Additionally, the propylene polymer composition, preferably the propylene copolymer composition comprising components (A), (B), (C) and optionally (D), shows improved non-linear viscoelastic behaviour as shown in the below defined Large Oscillatory Shear (LAOS) measurement:

The propylene copolymer composition preferably has a Large Amplitude Oscillatory Shear Non Linear Factor at a strain of 1000%, LAOS$_{NLF}$ (1000%), of from 1.5 to 5.0, more preferably from 1.7 to 4.5, still more preferably from 1.8 to 4.0 and most preferably from 1.9 to 3.5.

Further, the propylene copolymer composition preferably has a Large Amplitude Oscillatory Shear Non Linear Factor at a strain of 500%, LAOS$_{NLF}$ (500%), of from 2.0 to 6.0, more preferably from 2.5 to 5.5, still more preferably from 2.7 to 5.0 and most preferably from 2.8 to 4.5.

Still further, the propylene copolymer composition shows a favourable melt strength as shown in the strain hardening factor (SHF) defined below:

The propylene copolymer composition preferably has a strain hardening factor, measured at a strain rate of 10 s$^{-1}$ and a Hencky strain of 2.5 (SHF e10) of at least 1.15 up to 3.00, more preferably of at least 1.20 to 2.80, yet more preferably in the range of from 1.22 to 2.50 and most preferably in the range of from 1.24 to 2.00.

Additionally, the propylene copolymer composition preferably has a strain hardening factor, measured at a strain rate of 5 s$^{-1}$ and a Hencky strain of 2.5 (SHF e5) of at least 1.05 to 2.60, more preferably of 1.08 to 2.50, yet more preferably in the range of from 1.10 to 2.00 and most preferably in the range of from 1.13 to 1.80.

The Hencky strain is an indirect measure of the drawability and the strain hardening factor (SHF) is an indirect measure of the melt strength.

Further, the propylene copolymer composition, preferably the propylene copolymer composition comprising components (A), (B), (C) and optionally (D), preferably shows the following properties:

Further, the propylene copolymer composition preferably has a Vicat softening temperature A50 of from 40 to 80° C., more preferably of from 45 to 75° C. and most preferably of from 50 to 70° C., determined according to ASTM D 1525.

The propylene copolymer composition further preferably has a melting temperature Tm of from 145.0° C. to 160.0° C., more preferably of from 147.0° C. to 158.0° C., still more preferably of from 148.0° C. to 156.0° C. and most preferably of from 150.0° C. to 155.0° C., determined according to ISO 11357-3.

Still further, the propylene copolymer composition preferably has a crystallization temperature Tc of from 88.0° C. to 105.0° C., more preferably of from 90.0° C. to 100.0° C., still more preferably of from 91.0° C. to 97.0° C. and most preferably of from 92.0° C. to 96.0° C., determined according to ISO 11357-3.

Additionally, the propylene copolymer composition preferably has a heat of fusion Hf of from 10.0 J/g to 50.0 J/g, more preferably of from 15.0 J/g to 45.0 J/g, still more preferably of from 18.0 J/g to 40.0 J/g and most preferably of from 20.0 J/g to 35.0 J/g, determined according to ISO 11357-3.

Further, the propylene copolymer composition preferably has a crystallization enthalpy Hcr of from 20.0 J/g to 60.0 J/g, more preferably of from 25.0 J/g to 55.0 J/g, still more preferably of from 28.0 J/g to 50.0 J/g and most preferably of from 30.0 J/g to 45.0 J/g, determined according to ISO 11357-3.

It is further preferred that the propylene copolymer composition has an amount of xylene cold soluble (XCS) fraction in the range of from 35.0 to 65.0 wt %, more preferably of from 40.0 to 62.5 wt %, still more preferably of from 45.0 to 61.0 wt % and most preferably of from 50.0 to 60.0 wt %, based on the total amount of the propylene copolymer composition, determined according to ISO 16152 at a temperature of 25° C.

Further, the propylene copolymer composition preferably has an amount of solubles in n-hexane in the range of from 30.0 to 60.0 wt %, more preferably of from 32.5 to 57.5 wt %, still more preferably of from 33.5 to 55.0 wt % and most preferably of from 35.0 to 52.5 wt %, determined using a Soxhlet apparatus.

The propylene copolymer composition preferably has a complex viscosity at 0.05 rad/s, $eta^*_{0.05\ rad/s}$, of not more than 80000 Pa·s, more preferably not more than 60000 Pa·s, still more preferably not more than 40000 Pa·s and most preferably not more than 20000 Pa·s.

The lower limit of the complex viscosity at 0.05 rad/s, $eta^*_{0.05\ rad/s}$, is usually not lower than 10000 Pa·s, more preferably not lower than 12500 Pa·s.

Further, the propylene copolymer composition preferably has a complex viscosity at 300 rad/s, $eta^*_{300\ rad/s}$, of not more than 900 Pa·s, more preferably not more than 850 Pa·s, still more preferably not more than 800 Pa·s and most preferably not more than 750 Pa·s.

The lower limit of the complex viscosity at 300 rad/s, $eta^*_{300\ rad/s}$, is usually not lower than 500 Pa·s, more preferably not lower than 550 Pa·s and most preferably not lower than 650 Pa·s.

Still further, the propylene copolymer composition preferably has a complex viscosity at a G* of 1 kPa, $eta_{1\ kPa}$, of not more than 80000 Pa·s, more preferably not more than 60000 Pa·s, still more preferably not more than 40000 Pa·s and most preferably not more than 20000 Pa·s.

The lower limit of the complex viscosity at a G* of 1 kPa, $eta_{1\ kPa}$, is usually not lower than 10000 Pa·s, more preferably not lower than 12500 Pa·s.

Still further, the propylene copolymer composition preferably has a complex viscosity at a G* of 2.7 kPa, $eta_{2.7\ kPa}$, of not more than 80000 Pa·s, more preferably not more than 60000 Pa·s, still more preferably not more than 40000 Pa·s and most preferably not more than 20000 Pa·s.

The lower limit of the complex viscosity at a G* of 2.7 kPa, $eta_{2.7\ kPa}$, is usually not lower than 10000 Pa·s, more preferably not lower than 12500 Pa·s.

Further, the propylene copolymer composition preferably has a complex viscosity at a G* of 5 kPa, $eta_{1\ kPa}$, of not more than 70000 Pa·s, more preferably not more than 50000 Pa·s, still more preferably not more than 30000 Pa·s and most preferably not more than 18000 Pa·s.

The lower limit of the complex viscosity at a G* of 7 kPa, $eta_{7\ kPa}$, is usually not lower than 10000 Pa·s, more preferably not lower than 12500 Pa·s.

Additionally, the propylene copolymer composition preferably has a polydispersity index, PI, of from 0.8 to 3.5 $Pa^{-1}$, more preferably from 1.0 to 3.0 $Pa^{-1}$, still more preferably from 1.3 to 2.5 $Pa^{-1}$ and most preferably from 1.5 to 2.2 $Pa^{-1}$.

The above described complex viscosities and PI are measured by dynamic shear measurements complying with ISO 6721-1 and ISO 6721-10 at a temperature of 170° C.

Preferably, the propylene copolymer composition is obtained by melt blending the heterophasic propylene copolymer (A), the propylene based plastomer (B) and optionally the ethylene based plastomer (C), the propylene based plastomer (D) and further additives. Melt blending of the heterophasic propylene copolymer (A) with the propylene based plastomer (B) and optionally the ethylene based plastomer (C) and the propylene based plastomer (D) results in a heterophasic system wherein the propylene based plastomer (B) and optionally the ethylene based plastomer (C) and the propylene based plastomer (D) are dispersed within the heterophasic propylene copolymer (A) and substantially accumulate in the elastomeric phase of the heterophasic propylene copolymer (A).

In the following, the heterophasic propylene copolymer (A), the propylene based plastomer (B), the optional ethylene based plastomer (C) and the optional propylene based plastomer (D) are described in more detail.

Heterophasic Propylene Copolymer (A)

The propylene copolymer composition comprises from 55.0 to 90.0 wt %, based on the total amount of the propylene copolymer composition, of a heterophasic propylene copolymer (A) having a matrix phase and an elastomeric phase dispersed in said matrix phase, wherein the matrix phase is a propylene random copolymer, the heterophasic propylene copolymer (A) further having a melt flow rate $MFR_2$ of 0.2 to 12.0 g/10 min, determined according to ISO 1133 at a temperature of 230° C. and a load of 2.16 kg, and a xylene cold solubles (XCS) fraction in the range of from 20.0 to 50.0 wt % based on the total amount of the heterophasic propylene copolymer (A), determined according to ISO 16152 at a temperature of 25° C.

The heterophasic propylene copolymer (A) is preferably present in the propylene copolymer composition in an amount of from 55.0 to 90.0 wt %, more preferably from 57.0 to 85.0 wt % and most preferably from 60.0 to 80.0 wt %, based on the total amount of the propylene copolymer composition.

The heterophasic propylene copolymer (A) preferably has a melt flow rate $MFR_2$ of 0.5 to 10.0 g/10 min, more preferably of 0.7 to 8.0 g/10 min, still more preferably of 0.8 to 6.5 g/10 min and most preferably of 1.0 to 5.0 g/10 min, determined according to ISO 1133 at a temperature of 230° C. and a load of 2.16 kg.

In a heterophasic polypropylene copolymer the matrix phase and the elastomeric phase usually cannot exactly be divided from each other. In order to characterize the matrix phase and the elastomeric phase of a heterophasic polypropylene copolymer several methods are known. One method is the extraction of a fraction which contains to the most part the elastomeric phase with xylene, thus separating a xylene cold solubles (XCS) fraction from a xylene cold insoluble (XCI) fraction. The XCS fraction contains for the most part the elastomeric phase and only a small part of the matrix phase whereas the XCI fraction contains for the most part the matrix phase and only a small part of the elastomeric phase.

The heterophasic propylene copolymer (A) preferably has xylene cold solubles (XCS) fraction in the range of from 22.0 to 48.0 wt %, more preferably of from 24.0 to 46.0 wt % and most preferably of from 26.0 to 45.0 wt %, based on the total amount of the heterophasic propylene copolymer (A), determined according to ISO 16152 at a temperature of 25° C.

The total comonomer content of the heterophasic propylene copolymer (A) is preferably in the range of from 15.0 mol % to 35.0 mol %, more preferably of from 17.5 mol % to 32.5 mol %, still more preferably of from 19.0 mol % to 30.0 mol % and most preferably of from 20.0 mol % to 27.5 mol %.

The comonomer of the heterophasic propylene copolymer (A) is preferably selected from ethylene and alpha-olefin comonomers having from 4 to 10 carbon atoms. It is especially preferred that the comonomer of the heterophasic propylene copolymer (A) is ethylene.

The heterophasic propylene copolymer (A) preferably has a melting temperature Tm as determined by differential scanning calorimetry (DSC) of from 130° C. to 160° C., more preferably of from 140° C. to 157° C. and most preferably of from 145° C. to 155° C.

Further, the heterophasic propylene copolymer (A) preferably has a flexural modulus of from 130 MPa to 380 MPa, more preferably of from 150 MPa to 365 MPa and most preferably of from 175 MPa to 350 MPa, determined according to ISO 178 on injection moulded test specimens.

The heterophasic propylene copolymer (A) can be polymerized in a sequential multistage polymerization process, i.e. in a polymerization process in which two or more polymerization reactors are connected in series. Preferably, in the sequential multistage polymerization process, two or more, more preferably three or more, such as three or four, polymerization reactors are connected in series. The term "polymerization reactor" shall indicate that the main polymerization takes place. Thus in case the process consists of four polymerization reactors, this definition does not exclude the option that the overall process comprises for instance a pre-polymerization step in a pre-polymerization reactor.

Preferably, the matrix phase of the heterophasic propylene copolymer (A) is polymerized in first polymerization reactor for producing a unimodal matrix phase or in the first and second polymerization reactor for producing a multimodal matrix phase.

The elastomeric phase of the heterophasic propylene copolymer (A) is preferably polymerized in the subsequent one or two polymerization reactor(s) in the presence of the matrix phase for producing a unimodal elastomeric phase or a multimodal elastomeric phase.

Preferably, the polymerization reactors are selected from slurry phase reactors, such as loop reactors and/or gas phase reactors such as fluidized bed reactors, more preferably from loop reactors and fluidized bed reactors.

A preferred sequential multistage polymerization process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Suitable sequential polymerization processes for polymerizing the heterophasic propylene copolymer (A) are e.g. disclosed in EP 1 681 315 A1 or WO 2013/092620 A1.

The heterophasic propylene copolymer (A) can be polymerized in the presence of a Ziegler-Natta catalyst or a single site catalyst.

Suitable Ziegler-Natta catalysts are e.g. disclosed in U.S. Pat. No. 5,234,879, WO 92/19653, WO 92/19658, WO 99/33843, WO 03/000754, WO 03/000757, WO 2013/092620 A1 or WO 2015/091839.

Suitable single site catalysts are e.g. disclosed in WO 2006/097497, WO 2011/076780 or WO 2013/007650.

The heterophasic propylene copolymer (A) can optionally be subjected to a visbreaking step as e.g. described in WO 2013/092620 A1.

Heterophasic propylene copolymer resins suitable as heterophasic propylene copolymer (A) are also commercially available. These resin are usually already addivated with stabilizer packages. Thus, when using commercially available resins as heterophasic propylene copolymer (A) the addition of additives as described above might have to be adjusted to the already present additives.

Propylene Based Plastomer (B)

The propylene copolymer composition comprises from 5.0 to 25.0 wt %, based on the total amount of the propylene copolymer composition, of a propylene based plastomer (B) having a density in the range of from 845 to 870 kg/m$^3$, determined according to ASTM D1505 on compression moulded test specimens and a melt flow rate MFR$_2$ of 1.0 to 30.0 g/10 min, determined according to ASTM D1238 at a temperature of 190° C. and a load of 2.16 kg.

The propylene based plastomer (B) is preferably present in the propylene copolymer composition in an amount of from 10.0 to 23.0 wt %, more preferably from 12.0 to 22.0 wt % and most preferably from 15.0 to 20.0 wt %, based on the total amount of the propylene copolymer composition.

The propylene based plastomer (B) preferably has a density in the range of from 850 to 868 kg/m$^3$, still more preferably in the range of from 853 to 865 kg/m$^3$ and most preferably in the range of from 855 to 864 kg/m$^3$, determined according to ASTM D1505 on compression moulded test specimens.

The propylene based plastomer (B) preferably has a melt flow rate MFR$_2$ of 1.1 to 20.0 g/10 min, more preferably of 1.2 to 10.0 g/10 min, determined according to ASTM D1238 at a temperature of 190° C. and a load of 2.16 kg.

The propylene based plastomer (B) preferably is a copolymer of propylene and at least one comonomer copolymerizable with propylene, for example comonomers such as ethylene or C$_4$ to C$_{20}$ α-olefins, in particular ethylene and/or 1-butene, 1-hexene and 1-octene. Preferably the propylene based plastomer (B) according to this invention comprises, especially consists of, monomers copolymerizable with propylene from the group consisting of ethylene or 1-butene. More specifically the propylene based plastomer (B) of this invention comprises—apart from propylene—units derivable from ethylene or 1-butene. In a preferred embodiment the propylene based plastomer (B) comprises units derivable from propylene and ethylene only.

It is especially preferred that the propylene based plastomer (B) does not contain monomer units derivable from styrene or derivatives thereof. Accordingly, the propylene based plastomer (B) is preferably a copolymer that consists substantially, i.e. of at least 99.0 wt %, more preferably of at least 99.5 wt %, still more preferably of at least 99.8 wt %, like of at least 99.9 wt %, of propylene and ethylene units. In another embodiment only propylene and ethylene units are detectable, i.e. only propylene and ethylene have been polymerized.

In particular, it is preferred that the propylene based plastomer (B) is a copolymer of propylene and ethylene featured by a rather high propylene content.

Accordingly, it is preferred that the propylene based plastomer (B) has a propylene content of at least 60.0 mol %, more preferably at least 70.0 mol %, still more preferably at least 77.0 mol %. In particular, it is preferred that the propylene based plastomer (B) has a preferably propylene content in the range of 60.0 to 95.0 mol %, more preferably in the range of 70.0 to 85.0 mol %, still more preferably in the range of 75.0 to 80.0 mol %.

Additionally or alternatively to the previous paragraph, it is preferred that the propylene based plastomer (B) has a comonomer content, preferably ethylene content equal or below 30.0 mol %, more preferably in the range of 10.0 to 28.0 mol %, still more preferably in the range of 15.0 to 25.0 mol %, like in the range of 18.0 to 23.0 mol %.

The propylene based plastomer (B) preferably has a Vicat softening temperature of from 35 to 65° C., more preferably of from 40 to 60° C.

Further, the propylene based plastomer (B) preferably has a flexural modulus of from 5 to 25 MPa, more preferably of from 7 to 20 MPa and most preferably of from 10 to 17 MPa, determined according to ASTM D790.

Preferably, the propylene based plastomer (B) is a propylene rich elastomeric copolymer of propylene and ethylene known in the art. Such propylene rich resins are, for example, commercially available as Vistamaxx™ propylene-based elastomers from Exxon or Versify™ plastomers and elastomers from Dow Chemical Co.

Ethylene Based Plastomer (C)

The propylene copolymer composition can optionally further comprise from 5.0 to 25.0 wt %, based on the total amount of the propylene copolymer composition, of an ethylene based plastomer (C) having a density in the range of from 850 to 900 kg/m³, determined according to ISO 1183D on compression moulded test specimens and a melt flow rate $MFR_2$ of 0.5 to 30.0 g/10 min, determined according to ISO 1133 at a temperature of 190° C. and a load of 2.16 kg.

The ethylene based plastomer (C) is preferably present in the propylene copolymer composition in an amount of from 5.0 to 25.0 wt %, more preferably from 10.0 to 23.0 wt %, even more preferably from 12.0 to 22.0 wt % and most preferably from 15.0 to 20.0 wt %, based on the total amount of the propylene copolymer composition.

The ethylene based plastomer (C) preferably has a density in the range of from 853 to 895 kg/m³, still more preferably in the range of from 855 to 890 kg/m³ and most preferably in the range of from 857 to 887 kg/m³, determined according to ISO 1183D on compression moulded test specimens.

The ethylene based plastomer (C) preferably has melt flow rate $MFR_2$ of 0.5 to 30.0 g/10 min, more preferably of 0.6 to 29.0 g/10 min, more preferably of 0.7 to 28.5 g/10 min and most preferably of 0.8 to 28.0 g/10 min, determined according to ISO 1133 at a temperature of 190° C. and a load of 2.16 kg.

In one preferred embodiment the ethylene based plastomer (C) preferably has melt flow rate $MFR_2$ of 0.5 to 10.0 g/10 min, more preferably 0.6 to 9.0 g/10 min, still more preferably of 0.7 to 8.5 g/10 min and most preferably of 0.8 to 8.0 g/10 min, determined according to ISO 1133 at a temperature of 190° C. and a load of 2.16 kg.

The ethylene based plastomer (C) is a copolymer of ethylene and at least one comonomer copolymerizable with ethylene, for example comonomers such as C3 to C20 α-olefins, in particular C4 to C8 α-olefins, e.g. 1-butene, 1-hexene and/or 1-octene. Preferably the ethylene based plastomer (C) according to this invention comprises, especially consists of, monomers copolymerizable with ethylene from the group consisting of propylene, 1-butene, 1-hexene and 1-octene. More specifically the ethylene based plastomer (C) of this invention comprises—apart from ethylene—units derivable from 1-butene or 1-octene. In a preferred embodiment the ethylene based plastomer (C) comprises units derivable from ethylene and 1-octene only.

It is especially preferred that the ethylene based plastomer (C) does not contain monomer units derivable from styrene or derivatives thereof. Accordingly, the ethylene based plastomer (C) is preferably a copolymer that consists substantially, i.e. of at least 99.0 wt.-%, more preferably of at least 99.5 wt.-%, still more preferably of at least 99.8 wt.-%, like of at least 99.9 wt.-%, of ethylene and 1-octene units. In another embodiment only ethylene and 1-octene units are detectable, i.e. only ethylene and 1-octene have been polymerized.

The comonomer content, preferably 1-octene content, of the ethylene based plastomer (C) is in the range of 3.0 to 30.0 mol-%, yet more preferably in the range of 5.0 to 20.0 mol-%, still more preferably in the range of 7.5 to 18.0 mol-%.

The ethylene based plastomer (C) preferably has a Vicat softening temperature (determined according to ISO 306) of from 30 to 55° C., more preferably of from 32 to 50° C.

In one preferred embodiment the ethylene based plastomer (C) is prepared with at least one metallocene catalyst. The first elastomeric ethylene copolymer (E1) may also be prepared with more than one metallocene catalyst or may be a blend of multiple elastomers prepared with different metallocene catalysts. In some embodiments, the ethylene based plastomer (C) is a substantially linear ethylene polymer (SLEP). SLEPs and other metallocene catalysed ethylene based plastomer (C) are known in the art, for example, U.S. Pat. No. 5,272,236. These resins are also commercially available, for example, as Queo™ plastomers available from Borealis, ENGAGE™ and AFFINITY™ plastomer resins available from Dow Chemical Co., EXACT™ polymers from Exxon or TAFMER™ polymers from Mitsui, Lucene from LG Chemicals and Fortify from Sabic.

Propylene Based Plastomer (D)

The propylene copolymer composition can optionally comprise from 0.5 to 5.0 wt %, based on the total amount of the propylene copolymer composition, of a propylene based plastomer (D) having a density in the range of from 875 to 900 kg/m³, determined according to ASTM D1505 on compression moulded test specimens.

The propylene based plastomer (D) is preferably present in the propylene copolymer composition in an amount of from 1.0 to 4.5 wt %, more preferably from 1.5 to 4.0 wt % and most preferably from 2.0 to 3.5 wt %, based on the total amount of the propylene copolymer composition.

The propylene based plastomer (D) preferably has a density in the range of from 876 to 895 kg/m³, still more preferably in the range of from 877 to 890 kg/m³ and most preferably in the range of from 878 to 888 kg/m³, determined according to ASTM D1505 on compression moulded test specimens.

The propylene based plastomer (D) preferably has a melt flow rate $MFR_2$ of 3000 to 8000 g/10 min, more preferably of 4000 to 7500 g/10 min, and most preferably of 5000 to 7000 g/10 min, determined according to ISO 1133 at a temperature of 190° C. and a load of 2.16 kg, when using Gottfert MFR Grader MI40 with a half die.

The propylene based plastomer (D) preferably is a copolymer of propylene and at least one comonomer copolymerizable with propylene, for example comonomers such as ethylene or $C_3$ to $C_{20}$ α-olefins, in particular ethylene and/or 1-butene, 1-hexene and 1-octene. Preferably the propylene based plastomer (D) according to this invention comprises, especially consists of, monomers copolymerizable with propylene from the group consisting of ethylene or 1-butene. More specifically the propylene based plastomer (D) of this invention comprises—apart from propylene—units derivable from ethylene or 1-butene. In a preferred embodiment the propylene based plastomer (D) comprises units derivable from propylene and ethylene only.

It is especially preferred that the propylene based plastomer (D) does not contain monomer units derivable from styrene or derivatives thereof. Accordingly, the propylene based plastomer (D) is preferably a copolymer that consists substantially, i.e. of at least 99.0 wt %, more preferably of at least 99.5 wt %, still more preferably of at least 99.8 wt %, like of at least 99.9 wt %, of propylene and ethylene units. In another embodiment only propylene and ethylene units are detectable, i.e. only propylene and ethylene have been polymerized.

In particular, it is preferred that the propylene based plastomer (D) is a copolymer of propylene and ethylene featured by a rather high propylene content.

Accordingly, it is preferred that the propylene based plastomer (D) has a propylene content of at least 70.0 mol %, more preferably at least 80.0 mol %, still more preferably at least 87.0 mol %. In particular, it is preferred that the propylene based plastomer (D) has a preferably propylene content in the range of 70.0 to 96.0 mol %, more preferably in the range of 80.0 to 95.0 mol %, still more preferably in the range of 85.0 to 93.0 mol %.

Additionally or alternatively to the previous paragraph, it is preferred that the propylene based plastomer (D) has a comonomer content, preferably ethylene content equal or below 30.0 mol %, more preferably in the range of 4.0 to 30.0 mol %, still more preferably in the range of 5.0 to 20.0 mol %, like in the range of 7.0 to 15.0 mol %.

Preferably, the propylene based plastomer (D) is a propylene rich elastomeric copolymer of propylene and ethylene known in the art. Such propylene rich resins are, for example, commercially available as Vistamaxx™ propylene-based elastomers from Exxon or Versify™ plastomers and elastomers from Dow Chemical Co.

Article

The present invention further relates to an article comprising the propylene copolymer composition as defined above or below.

The article is preferably selected from automotive articles, such as car interiors, like car upholstery, or construction articles, such as single ply roofing, like single ply roofing membranes.

The single ply roofing membrane is preferably composed of
i) a top layer,
ii) a bottom layer, and
iii) optionally a scrim layer,
wherein either layer i) or ii) or both layers i) and ii) comprise the propylene copolymer composition as defined above or below.

Use

The present invention further relates to the use of the propylene copolymer composition as defined above or below for the production of an article, preferably an article as defined above such as in a single ply roofing membrane or car upholstery.

Examples

1. Measurement Methods a) Melt Flow Rate ($MFR_2$)

The melt flow rate is the quantity of polymer in grams which the test apparatus standardized to ISO 1133 or ASTM D1238 extrudes within 10 minutes at a certain temperature under a certain load.

The melt flow rate $MFR_2$ of propylene based polymers is measured at 230° C. with a load of 2.16 kg (MFR230/2.16) according to ISO 1133 with the exception of propylene based plastomers (B) and (D).

The melt flow rate $MFR_2$ of propylene based plastomer (D) is measured according to ISO 1133 at a temperature of 190° C. and a load of 2.16 kg when using Gottfert MFR Grader MI40 with a half die.

The melt flow rate $MFR_2$ of propylene based plastomer (B) is measured at 190° C. with a load of 2.16 kg (MFR190/2.16) according to ASTM D1238.

The melt flow rate $MFR_2$ of ethylene-based plastomer (C) is measured at 190° C. with a load of 2.16 kg (MFR190/2.16) according to ISO 1133.

The melt flow rate $MFR_2$ of the propylene copolymer composition is measured at 230° C. with a load of 2.16 kg (MFR230/2.16) according to ISO 1133.

b) Density

The density is measured according to ISO 1183D. The samples preparation is carried out by compression moulding according to ISO 1872-2:2007.

The density of the propylene based plastomers (B) and (D) is measured according to ASTM D1505 using compression moulded test specimens.

c) Comonomer Content

Quantitative nuclear-magnetic resonance (NMR) spectroscopy was used to quantify the comonomer content of the polymers.

Comonomer Content Quantification of Poly(Propylene-Co-Ethylene) Copolymers

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probe head at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent {8}. To ensure a homogeneous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme {3, 4}. A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the $^{13}C\{^1H\}$ spectra. This method was chosen for its robust nature and ability to account for the presence of regiodefects when needed. Integral regions were slightly adjusted to increase applicability across the whole range of encountered comonomer contents.

For systems where only isolated ethylene in PPEPP sequences was observed the method of Wang et al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E \text{ [mol \%]}=100*fE$$

The weight percent comonomer incorporation was calculated from the mole fraction:

$$E \text{ [wt \%]}=100*(fE*28.06)((fE*28.06)+((1-fE)*42.08))$$

BIBLIOGRAPHIC REFERENCES

1) Busico, V., Cipullo, R., Prog. Polym. Sci. 26 (2001) 443.
2) Busico, V., Cipullo, R., Monaco, G., Vacatello, M., Segre, A. L., Macromolecules 30 (1997) 6251.
3) Zhou, Z., Kuemmerle, R., Qiu, X., Redwine, D., Cong, R., Taha, A., Baugh, D. Winniford, B., J. Mag. Reson. 187 (2007) 225.
4) Busico, V., Carbonniere, P., Cipullo, R., Pellecchia, R., Severn, J., Talarico, G., Macromol. Rapid Commun. 2007, 28, 1128.
5) Resconi, L., Cavallo, L., Fait, A., Piemontesi, F., Chem. Rev. 2000, 100, 1253.
6) Wang, W-J., Zhu, S., Macromolecules 33 (2000), 1157.
7) Cheng, H. N., Macromolecules 17 (1984), 1950.
8) Singh, G., Kothari, A., Gupta, V., Polymer Testing 28 5 (2009), 475.
9) Kakugo, M., Naito, Y., Mizunuma, K., Miyatake, T. Macromolecules 15 (1982) 1150.
10) Randall, J. Macromol. Sci., Rev. Macromol. Chem. Phys. 1989, C29, 201.
11) Resconi, L., Cavallo, L., Fait, A., Piemontesi, F., Chem. Rev. 2000, 100, 1253.

d) Differential Scanning Calorimetry (DSC) Analysis, Melting Temperature (Tm) and Crystallization Temperature (Tc)

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

e) Xylene Cold Solubles (XCS) Content is measured at 25° C. according to ISO 16152, first edition; 2005 Jul. 1.

f) The Hexane Extractable Fraction

The fraction extractable in n-hexane is determined according to the following procedure using a Soxhlet apparatus:

A 250 ml round bottom flask is dried in a vacuum drying oven at 110° C. until a constant weight is reached. The dried flask is then cooled in a desiccator to room temperature and its weight is then noted to an accuracy of 0.0001 g.

1 g (±0.1 g) of the sample is weighed into a Soxhlet thimble (Schleicher & Schüll 603) with an accuracy of 0.0001 g. The Soxhlet thimble is closed by means of a cut-off second Soxhlet thimble that is inserted bottom first into the first Soxhlet thimble containing the sample.

The dried and cooled down round bottom flask is filled with 150 ml n-hexane and is situated into a heating mantle. The closed Soxhlet thimble is situated into the Soxhlet apparatus and the Soxhlet apparatus is situated onto the round bottom flask. A water cooling device is mounted onto the apparatus and the heating mantle is switched on at stage 2 for an extraction for 24 hours. After said 24 hours the heating and cooling is stopped and the round bottom flask is taken out of the Soxhlet apparatus. The Soxhlet thimble is taken out of the flask with tweezers and the n-hexane is drained into the flask. Optional n-hexane remaining in the Soxhlet apparatus is also drained into the flask.

The content of the round bottom flask is then concentrated to dryness in a rotovapor under nitrogen stream, the flask containing the residue is further dried over night under vacuum at 90° C. and then cooled to room temperature in an desiccator. The dried round bottom flask is finally weight with an accuracy of 0.0001 g and the hexane extractable fraction is calculated according to the following formula:

$$\%c_6 = \frac{(m_2 - m_t) \times 100}{m_1}$$

with $\%C_6$ = n–hexane extractable fraction $m_1$ = weigh–in sample $m_2$ = final gross weight of the round bottom flask $m_t$ = tare of the round bottom flask g) Flexural Modulus

The flexural modulus was determined according to ISO 178 at a test speed of 2 mm/min and a force of 100 N, whereby the length of the span between the supports was 64 mm, on test specimens having a dimension of 80×10×4 mm³ (length×width×thickness) prepared by injection moulding according to EN ISO 1873-2.

h) Tensile Test

The tensile test (modulus, stress and strain at break and stress and strain at yield) is measured at 23° C. and 80° C. according to ISO 527-1 (cross head speed 1 mm/min) using type 1A directly injection moulded test specimens according to ISO 527-2(1A). After preparation of the test specimen were prepared the polymer in the test specimens were rested at room temperature for 96 h before testing to ensure that the polymer is fully crystallized.

i) Charpy Notched Impact Strength

Charpy notched impact strength is determined according to ISO 179/1A at temperatures of −20° C., −30° C. and −40° C. by using injection moulded test specimens as described in EN ISO 1873-2 (80×10×4 mm).

j) Vicat Softening Temperature

The Vicat softening temperature is measured according to ASTM D 1525 (=ISO 306) method A (50° C./h, 1ON).

k) Fogging Determined According to DIN 75201 Method B

Fogging is measured on a 2 mm compression moulded specimen. Fogging means the evaporation of volatiles matters of trim materials of vehicles. The measurements were done on compression moulded specimens (diameter 80 mm+/−1 mm, thickness 2 mm) according to ISO 75201, method B. This method evaluates the volatility of organic constituents by gravimetric measurements. The samples were dried at room temperature for 24 h using silica gel in a desiccator. The test was done at 100° C. The beakers have to be closed by using tarred aluminium foils (diameter 103 mm, thickness 0.03 mm) and glass plates and the cooling plates on top. After the testing time (16 h at 100° C.) the glass plates have to be removed (not usefully anymore at this method), the aluminium foils are removed and weighted back. The gravimetric Fogging value "G" (%) shall be determined by the following equation: G=weight of aluminium foil after Fogging test—tare of the aluminium foil, in mg G sample=Average in mg of the 2 foils used for each sample.

l) Carbon Emission

The total amount of volatiles is measured according to according to VDA 277:1995 from pellets. The Total Volatiles value is the total emission of organic carbon, determined according to the method in VDA 277.

m) Dynamic Shear Measurements (Frequency Sweep Measurements)

The characterisation of melt of polymer composition or polymer as given above or below in the context by dynamic shear measurements complies with ISO standards 6721-1 and 6721-10. The measurements were performed on an Anton Paar MCR 501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 170° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$ and $\gamma_0$ are the stress and strain amplitudes, respectively $\omega$ is the angular frequency $\delta$ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, □*, the dynamic shear viscosity, □', the out-of-phase component of the complex shear viscosity □ " and the loss tangent, tan □□ which can be expressed as follows:

$$G' = \frac{\sigma_0}{\gamma_0} \cos\delta [Pa] \quad (3)$$

$$G'' = \frac{\sigma_0}{\gamma_0} \sin\delta [Pa] \quad (4)$$

-continued $$G^* = G' + iG'' \, [Pa] \quad (5)$$

$$\eta^* = \eta' - i\eta'' \, [Pa.s] \quad (6)$$

$$\eta' = \frac{G''}{\omega} \, [Pa.s] \quad (7)$$

$$\eta'' = \frac{G'}{\omega} \, [Pa.s] \quad (8)$$

The polydispersity index, PI, is defined by equation 9.

$$PI = \frac{10^5}{G'(\omega_{COP})}, \quad \omega_{COP} = \omega \text{ for } (G' = G'') \quad (9)$$

where $\omega_{COP}$ is the cross-over angular frequency, determined as the angular frequency for which the storage modulus, G', equals the loss modulus, G''.

REFERENCES

[1] Rheological characterization of polyethylene fractions" Heino, E. L., Lehtinen, A., Tanner J., Seppala, J., Neste Oy, Porvoo, Finland, Theor. Appl. Rheol., Proc. Int. Congr. Rheol., 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

n) Large Amplitude Oscillatory Shear (LAOS)

The investigation of the non-linear viscoelastic behaviour under shear flow was done resorting to Large Amplitude Oscillatory Shear. The method requires the application of a sinusoidal strain amplitude, $\gamma_0$, imposed at a given angular frequency, $\omega$, for a given time, t. Provided that the applied sinusoidal strain is high enough, a non-linear response is generated. The stress, $\sigma$, is in this case a function of the applied strain amplitude, time and the angular frequency. Under these conditions, the non-linear stress response is still a periodic function; however, it can no longer be expressed by a single harmonic sinusoid. The stress resulting from linear viscoelastic response [1-3] can be expressed by a Fourier series, which includes higher harmonics contributions:

$$\sigma(t,\omega,\gamma_0) = \gamma_0 \cdot \Sigma_n [G'_n(\omega,\gamma_0) \cdot \sin(n\omega t) + G''_n(\omega,\gamma_0) \cdot \cos(n\omega t)]$$

with σ=stress response
t=time
ω=frequency
$\gamma_0$=strain amplitude
n=harmonic number
$G'_n$=n order elastic Fourier coefficient
$G''_n$=n order viscous Fourier coefficient The non-linear viscoelastic response was analysed applying Large Amplitude Oscillatory Shear (LAOS). Time sweep measurements were undertaken on an RPA 2000 rheometer from Alpha Technologies coupled with a standard biconical die. During the course of the measurement the test chamber is sealed and a pressure of about 6 MPa is applied.

The LAOS test is done applying a temperature of 190° C., an angular frequency of 0.628 rad/s and a strain of 1000% ($LAOS_{NLF}$ (1000%)) or 500% ($LAOS_{NLF}$ (500%)). In order to ensure that steady state conditions are reached, the non-linear response is only determined after at least 20 cycles per measurement are completed. The Large Amplitude Oscillatory Shear Non-Linear Factor ($LAOS_{NLF}$) is defined by:

$$LAOS_{NLF}(X\%) = \left|\frac{G'_1}{G'_3}\right|$$

with $G'_1$ = first order of elastic Fourier coefficient
$G'_3$ = third order of elastic Fourier coefficient

REFERENCES

1. J. M. Dealy, K. F. Wissbrun, Melt Rheology and Its Role in Plastics Processing: Theory and Applications; edited by Van Nostrand Reinhold, New York (1990)
2. S. Filipe, Non-Linear Rheology of Polymer Melts, AIP Conference Proceedings 1152, pp. 168-174 (2009) 3.
3. M. Wilhelm, Macromol. Mat. Eng. 287, 83-105 (2002)
4. S. Filipe, K. Hofstadler, K. Klimke, A. T. Tran, Non-Linear Rheological Parameters for Characterisation of Molecular Structural Properties in Polyolefins, Proceedings of Annual European Rheology Conference, 135 (2010)
5. S. Filipe, K. Klimke, A. T. Tran, J. Reussner, Proceedings of Novel Non-Linear Rheological Parameters for Molecular Structural Characterisation of Polyolefins, Novel Trends in Rheology IV, Zlin, Check Republik (2011)
6. K. Klimke, S. Filipe, A. T. Tran, Non-linear rheological parameters for characterization of molecular structural properties in polyolefins, Proceedings of European Polymer Conference, Granada, Spain (2011)

o) Uniaxial Extensional Viscosity by Sentamanat Extension Rheometer (SER)

The uniaxial extensional viscosity, $\eta^+_E(t, \dot{\varepsilon})$ was obtained from uniaxial extensional flow measurements, conducted on an Anton Paar MCR 501 coupled with the Sentmanat extensional fixture (SER-1). The temperature for the uniaxial extensional flow measurements was set at 170° C., applying extension rates range from 0.3 s$^{-1}$ to 10 s$^{-1}$. Particularly care was taken for the preparation of the samples for the extensional flow. The samples were prepared by compression moulding at 230° C. followed by slow cooling to room temperature (forced water or air cooling were not used). This procedure allowed obtaining well shaped samples free of residual stresses. The sample was left for some minutes at the testing temperature to ensure thermal stability, before carrying out the uniaxial extensional flow measurements. The sample's dimensions were fixed: 18 mm length, 10 mm width and 0.6 mm thickness.

p) Strain Hardening Factor (SHF)

The strain hardening factor is defined as $$SHF = \frac{\eta^+_E(t, \dot{\varepsilon})}{\eta^+_{LVE}(t)} = \frac{\eta^+_E(t, \dot{\varepsilon})}{3\eta^+(t)}$$

-continued with $\eta_E^+(t, \dot{\varepsilon})$ = uniaxial extension viscosity, determined according to o $\eta_{LVE}^+(t)$ = three time the time dependent shear viscosity $\eta^+(t)$ in the linear range of deformation The determination of the linear viscoelastic envelop in extension $\eta^+_{LVE}$ (t), using IRIS Rheo Hub 2008, required the calculation of the discrete relaxation time spectrum from the storage and loss modulus date (G', G" (ω)) was obtained by frequency sweep measurements as described above. The underlying calculation principles used for the determination of the discrete relaxation spectrum are described in Baumgartel M, Winter H H, "Determination of the discrete relaxation and retardation time spectra from dynamic mechanical data", Rheol Acta 28:511-519 (1989).

IRIS RheoHub 2008 expresses the relaxation time spectrum as a sum of N Maxwell modes $$\dot{G}(t) = G_e \cdot \sum_1^N g_i \cdot e^{-\frac{t}{\lambda_i}}$$

with $g_i$ and $\lambda_i$ are material parameters
$G_e$ is the equilibrium modulus The choice for the maximum number of modes, N, used for determination of the discrete relaxation spectrum, was done by using the option "optimum" from IRIS RheoHub 2008. The equilibrium modulus $G_e$ was set at zero. The non-linear fitting used to obtain $\eta^+_{LVE}$ (t) was performed on IRIS RheoHub 2008, using the Doi-Edwards model.

The Hencky strain is an indirect measure of material drawability and is determined as follows:

Hencky strain [ ]=time [s]·Hencky Strain Rate [s$^{-1}$]

2. Propylene Copolymer Composition

The following resins were used for the preparation of the propylene copolymer compositions of the examples:

a) Polymerization of the Heterophasic Propylene Copolymers A1 and A2

Catalyst

The catalyst used in the polymerization process for the heterophasic propylene copolymers A1 and A2 has been produced as follows: First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used.

Polymerization of Heterophasic Propylene Copolymer A2

Heterophasic propylene copolymer A2 has been produced in a Borstar™ plant in the presence of the above described polymerization catalyst using one liquid-phase loop reactor and two gas phase reactors connected in series under conditions as shown in Table 1. The first reaction zone was a loop reactor and the second and third reaction zones were gas phase reactors.

TABLE 1

Polymerization conditions of heterophasic propylene copolymer A2:

|  |  | A2 |
|---|---|---|
| Prepolymerization |  |  |
| TEAL | [kg/h] | 4.1 |
| Donor | [kg/h] | 0.66 |
| Temperature | [° C.] | 20 |
| res. time | [h] | 0.33 |
| Loop |  |  |
| Temperature | [° C.] | 70 |
| Split | [%] | 15 |
| H2/C3 ratio | [mol/kmol] | 5.5 |
| C2-feed | [kg/h] | 253 |
| MFR$_2$ | [g/10 min] | 6.0 |
| XCS | [wt %] | 3.0 |
| C2 | [wt %] | 2.0 |
| GPR 1 |  |  |
| Temperature | [° C.] | 75 |
| Pressure | [barg] | 21.3 |
| Split | [%] | 60 |
| H2/C3 ratio | [mol/kmol] | 21.8 |
| C2/C3 ratio | [mol/kmol] | 63.0 |
| MFR$_2$ | [g/10 min] | 1.7 |
| XCS | [wt %] | 22.0 |
| C2 content | [wt %] | 6.5 |
| GPR 2 |  |  |
| Temperature | [° C.] | 80 |
| Pressure | [barg] | 15 |
| Split | [%] | 25 |
| C2/C3 ratio | [mol/kmol] | 400 |
| H2/C2 ratio | [mol/kmol] | 180 |
| MFR$_2$ | [g/10 min] | 2.0 |
| XCS | [wt %] | 43.0 |
| C2 content (total) | [wt %] | 15.0 |

Heterophasic propylene copolymer A2 has a melt flow rate MFR$_2$ (230° C., 2.16 kg) of 2.0 g/10 min, a flexural modulus of 330 MPa and a melting temperature Tm of 151° C.

Preparation of Heterophasic Propylene Copolymer A1

Heterophasic propylene copolymer A1 is prepared by vis-breaking heterophasic propylene copolymer A2 to a melt flow rate MFR$_2$ (230° C., 2.16 kg) of 3.8 g/10 min as disclosed in the example section of WO 2017/198633.

Heterophasic propylene copolymer A1 has a melt flow rate MFR$_2$ (230° C., 2.16 kg) of 3.8 g/10 min, a flexural modulus of 330 MPa and a melting temperature Tm of 149° C.

b) Commercially Available Components

Plastomer B1: Propylene based plastomer with random ethylene distribution having a density of 862 kg/m³, melt flow rate MFR$_2$ (190° C., 2.16 kg) of 1.4 g/10 min, an ethylene content of 16 wt % and a flexural modulus of 14.4 MPa, commercially available from ExxonMobil as Vistamaxx 6102

Plastomer B2: Propylene based plastomer with random ethylene distribution having a density of 862 kg/m³, melt flow rate MFR$_2$ (190° C., 2.16 kg) of 9.1 g/10 min, an ethylene content of 15 wt % and a flexural modulus of 12.8 MPa, commercially available from ExxonMobil as Vistamaxx 6202

Plastomer C1: Ethylene-1-octene plastomer having a density of 870 kg/m³ and melt flow rate MFR$_2$ (190° C., 2.16 kg) of 1.0 g/10 min, commercially available from Borealis AG as Queo 7001LA Plastomer C2: Ethylene-1-octene plastomer having a density of 862 kg/m³ and melt flow rate MFR$_2$ (190° C., 2.16 kg) of 1.0 g/10 min, commercially available from Borealis AG as Queo 6201LA-P Plastomer C3: Ethylene-1-octene plastomer having a density of 870 kg/m³ and melt flow rate MFR$_2$ (190° C., 2.16 kg) of 6.6 g/10 min, commercially available from Borealis AG as Queo 7007LA Plastomer D: Propylene based plastomer with random ethylene distribution having a density of 879 kg/m³, melt flow rate MFR$_2$ (190° C., 2.16 kg, half die) of 6627.44 g/10 min, an ethylene content of 6 wt % and a melting temperature Tm of 97° C., commercially available from ExxonMobil as Vistamaxx 8880

TPO-Ref: Propylene based thermoplastic polyolefin (TPOs) manufactured in the presence of a Ziegler-Natta catalyst using the LyondellBasell's proprietary Catalloy process having a density of 880 kg/m³, a melt flow rate MFR$_2$ (230° C., 2.16 kg) of 0.6 g/10 min, a flexural modulus of 100 MPa and a XCS content of 64.8 wt %, commercially available from LyondellBasell, Italy as Adflex Q100F c) Preparation of the Polymer Compositions For the examples the following compositions as listed in Tables 2 to 4 were produced by melt blending:

TABLE 2

Propylene copolymer compositions of inventive examples IE1-4 and comparative examples CE1-4 using heterophasic propylene copolymer A1, plastomer B2 and optionally plastomer C3

|  | IE1 | IE2 | IE3 | IE4 | CE1 | CE2 | CE3 | CE4 |
|---|---|---|---|---|---|---|---|---|
| A1 [wt %] | 85 | 80 | 80 | 70 | 85 | 85 | 80 | 100 |
| B2 [wt %] | 15 | 20 | 10 | 15 | 5 | — | — | — |
| C3 [wt %] | — | — | 10 | 15 | 10 | 15 | 20 | — |

TABLE 3

Propylene copolymer compositions of inventive examples IE5-8 using heterophasic propylene copolymer A1 and plastomers B1 and C1 or C2

|  | IE5 | IE6 | IE7 | IE8 |
|---|---|---|---|---|
| A1 [wt %] | 70 | 60 | 70 | 60 |
| B1 [wt %] | 15 | 20 | 15 | 20 |
| C1 [wt %] | 15 | 20 | — | — |
| C2 [wt %] | — | — | 15 | 20 |

TABLE 4

Propylene copolymer compositions of inventive examples IE9-12 and comparative example CE5 using heterophasic propylene copolymer A2 and plastomers B1 and C1

|  | IE9 | IE10 | IE11 | IE12 | CE5 |
|---|---|---|---|---|---|
| A2 [wt %] | 70 | 67 | 60 | 57 | 100 |
| B1 [wt %] | 15 | 15 | 20 | 20 | — |
| C1 [wt %] | 15 | 15 | 20 | 20 | — |
| D [wt %] | — | 3 | — | 3 | — |

3. Properties of the Propylene Copolymer Compositions

The properties of the propylene copolymer compositions of inventive examples IE1-12 and comparative examples CE1-5 were measured.

As reference example Ref1 a propylene copolymer composition consisting of 100 wt % TPO-Ref was used. For Ref1 tensile modulus, DSC data, volatile emission, fogging, rheological properties, LAOS and SHF were measured. The other properties indicated with * listed in Tables 5 and 6 were taken from the technical data sheet.

The properties of the examples are listed in Tables 5 and 6.

FIG. 1 shows the behaviour of the strain hardening factor at a strain rate of 10.0 s$^{-1}$ (SHF e10) for Hencky strains in the range of about 0.5 to about 3.5.

FIG. 2 shows the behaviour of the strain hardening factor at a strain rate of 5.0 s$^{-1}$ (SHF e5) for Hencky strains in the range of about 0.5 to about 4.5.

Thereby, in FIGS. 1 and 2 sample 1 represents IE12, sample 2 represents Ref1, sample 3 represents HIFAX CA 10 A, commercially available from LyondellBasell, sample 4 represents CE5 and sample 5 represents IE11.

TABLE 5

Properties of examples IE1-8, CE1-4 and Ref1

|  | IE1 | IE2 | IE3 | IE4 | IE5 | IE6 | IE7 | IE8 | CE1 | CE2 | CE3 | CE4 | Ref1 |
|---|---|---|---|---|---|---|---|---|---|---|---|---|---|
| MFR$_2$ [g/10 min] | 4.84 | 5.30 | 5.14 | 5.30 | 4.32 | 3.37 | 3.53 | 3.44 | 4.71 | 4.65 | 4.20 | 3.80 | 0.6* |
| Tens Mod [MPa] | 264 | 176 | 281 | 160 | 181 | 131 | 175 | 158 | 304 | 362 | 232 | 380 | n.d. |

TABLE 5-continued

Properties of examples IE1-8, CE1-4 and Ref1

|  | IE1 | IE2 | IE3 | IE4 | IE5 | IE6 | IE7 | IE8 | CE1 | CE2 | CE3 | CE4 | Ref1 |
|---|---|---|---|---|---|---|---|---|---|---|---|---|---|
| 375 MPa - 6x amount B | 285 | 255 | 315 | 285 | 285 | 255 | 285 | 255 | 345 | n.a. | n.a | n.a. | n.a. |
| Stress Yield [MPa] | n.d. | n.d. | n.d. | n.d. | 7.3 | 6.5 | 7.3 | 7.0 | n.d. | n.d. | n.d. | n.d. | No yield Pt* |
| Strain Yield [%] | n.d. | n.d. | n.d. | n.d. | 50.1 | 61. | 52.6 | 53.5 | n.d. | n.d. | n.d. | n.d. | No yield Pt* |
| Stress Break [MPa] | n.d. | n.d. | n.d. | n.d. | 8.0 | 7.0 | 8.2 | 8.2 | n.d. | n.d. | n.d. | n.d. | 10* |
| Strain Break [%] | n.d. | n.d. | n.d. | n.d. | >350 | >350 | >350 | >350 | n.d. | n.d. | n.d. | n.d. | 500* |
| Charpy NIS, −20° C. [kJ/m$^2$] | NB | 80.2 | NB | NB | NB | NB | NB | NB | NB | 79.7 | 93.0 | 69.1 | PB: 110* |
| Charpy NIS, −30° C. [kJ/m$^2$] | n.d. | n.d. | n.d. | n.d. | 6.6 | NB | 74.6 | NB | n.d. | n.d. | n.d. | n.d. | n.d. |
| Charpy NIS, −40° C. [kJ/m$^2$] | n.d. | n.d. | n.d. | n.d. | 2.4 | 3.7 | 3.0 | 3.6 | n.d. | n.d. | n.d. | n.d. | 5* | n.d. not determined;

n.a. not applicable;

NB no break;

PB partial break

TABLE 6

Properties of examples IE9-12, CE5 and Ref1

|  | IE9 | IE10 | IE11 | IE12 | CE5 | Ref1 |
|---|---|---|---|---|---|---|
| MFR$_2$ [g/10 min] | 2.82 | 2.96 | 2.80 | 2.49 | 2.01 | 0.6* |
| Flex Mod [MPa] | 165 | 159 | 136 | 124 | 333 | 100* |
| Tens Mod [MPa] | 184 | 165 | 140 | 127 | 347 | n.d. |
| 375 MPa - 6x amount B | 285 | 285 | 255 | 255 | n.a. | n.a. |
| Stress Yield [MPa] | 7.8 | 7.7 | 6.7 | 6.5 | 12.2 | No yield Pt* |
| Strain Yield [%] | 32.9 | 32.0 | 37.3 | 40.0 | 19.1 | No yield Pt* |
| Stress Break [MPa] | 14.4 | 14.1 | 13.7 | 12.2 | 19.4 | 10* |
| Strain Break [%] | 561 | 555 | 621 | 499 | 487 | 500* |
| Tens Mod, 80° C. [MPa] | 41 | 40 | 32 | 31 | 78 | n.d. |
| Stress Yield, 80° C. [MPa] | 2.27 | 2.26 | 1.92 | 1.89 | 3.91 | n.d. |
| Strain Yield, 80° C. [%] | 46.3 | 44.6 | 62.0 | 76.1 | 22.9 | n.d. |
| Stress Break, 80° C. [MPa] | 2.27 | 2.26 | 1.92 | 1.89 | 3.91 | n.d. |
| Strain Break, 80° C. [%] | 46.3 | 44.6 | 62.0 | 76.1 | 22.9 | n.d. |
| Charpy NIS, −20° C. [kJ/m$^2$] | 83.4 | 75.7 | NB | NB | 3.1 | PB: 110* |
| Charpy NIS, −30° C. [kJ/m$^2$] | 8.7 | 3.6 | NB | 6.6 | 1.9 | n.d. |
| Charpy NIS, −40° C. [kJ/m$^2$] | 2.34 | 2.22 | 3.23 | 3.30 | 1.74 | 5* |
| Hcr [J/g] | 40.5 | 40.5 | 35.5 | 33.3 | 46.9 | 27.1 |
| Tcr [° C.] | 95.4 | 94.4 | 94.3 | 94.7 | 96.6 | 97.9 |
| Hf [J/g] | 33.4 | 31.2 | 26.8 | 25.9 | 52.8 | 28.9 |

TABLE 6-continued

Properties of examples IE9-12, CE5 and Ref1

|  | IE9 | IE10 | IE11 | IE12 | CE5 | Ref1 |
|---|---|---|---|---|---|---|
| Tm [° C.] | 151.7 | 151.2 | 151.2 | 151.1 | 151.5 | 143.4 |
| Vicat A50 [° C.] | 68.4 | 67.7 | 60.2 | 58.5 | 100.8 | 60* |
| XCS [wt %] | 52.6 | 53.2 | 58.3 | 59.5 | 34.7 | 64.8* |
| C6 extractables [wt %] | 37.2 | 38.0 | 49.1 | 49.5 | 18.3 | n.d. |
| Total emission [μgC/g] | 41 | 46 | 46 | 46 | 4 | <1 |
| Fogging [mg] | 0.03 | 0.03 | 0.04 | 0.07 | 0.03 | 0.29 |
| eta*$_{0.05\ rad/s}$ [Pa · s] | n.d. | n.d. | 17372 | 18153 | 25597 | 88502 |
| eta*$_{300\ rad/s}$ [Pa · s] | n.d. | n.d. | 710 | 707 | 640 | 934 |
| eta$_{1\ kPa}$ [Pa · s] | n.d. | n.d. | 17067 | 17927 | 26523 | n.d. |
| eta$_{2.7\ kPa}$ [Pa · s] | n.d. | n.d. | 14657 | 15443 | 22467 | 101169 |
| eta$_{5\ kPa}$ [Pa · s] | n.d. | n.d. | 12772 | 13482 | 19475 | 84622 |
| LAOS$_{NLF}$ (1000%) | n.d. | n.d. | 2.14 | 1.99 | 1.59 | 1.71 |
| LAOS$_{NLF}$ (500%) | n.d. | n.d. | 3.24 | 3.06 | 2.54 | 2.43 |
| SHF e10 (Hencky strain 2.5) | n.d. | n.d. | 1.28 | 1.25 | 1.31 | 1.05 |
| SHF e5 (Hencky strain 2.5) | n.d. | n.d. | 1.16 | 1.19 | 1.12 | 0.93 | n.d. not determined
n.a. not applicable
NB no break
PB partial break

The invention claimed is:

1. A propylene copolymer composition comprising:
(A) from 55.0 to 90.0 wt %, based on the total amount of the propylene copolymer composition, of a heterophasic propylene copolymer having a matrix phase and an elastomeric phase dispersed in said matrix phase, wherein the matrix phase is a propylene random copolymer,
the heterophasic propylene copolymer further having a melt flow rate MFR$_2$ of 0.2 to 12.0 g/10 min, determined according to ISO 1133 at a temperature of 230° C. and a load of 2.16 kg, and
a xylene cold solubles (XCS) fraction in the range of from 20.0 to 50.0 wt % based on the total amount of the heterophasic propylene copolymer (A), determined according to ISO 16152 at a temperature of 25° C., and
(B) from 10.0 to 23.0 wt %, based on the total amount of the propylene copolymer composition, of a propylene based plastomer having a density in the range of from 845 to 870 kg/m³, determined according to ASTM D1505 on compression moulded test specimens and a melt flow rate MFR$_2$ of 1.0 to 30.0 g/10 min, determined according to ASTM D1238 at a temperature of 230° C. and a load of 2.16 kg,
wherein the propylene copolymer composition has a tensile modulus of below 300 MPa, determined according to ISO 527-2, measured on injection moulded test specimens, and follows the following inequation:

tensile modulus [MPa]<375 MPa−6×amount of (B)× MPa/wt %, wherein in the above inequation, the "amount of (B)" represents a numerical value corresponding to the amount of propylene based plastomer (B) in [wt %], based on the total weight of propylene copolymer composition.

2. The propylene copolymer composition according to claim 1, wherein the propylene copolymer composition follows one or more of the following inequations:

tensile modulus [MPa]<360 MPa−6×amount of (B)× MPa/wt %, tensile modulus [MPa]<350 MPa−6×amount of (B)× MPa/wt %, or tensile modulus [MPa]<325 MPa−6×amount of (B)× MPa/wt %, wherein in the above inequations, the "amount of (B)" represents a numerical value corresponding to the amount of propylene based plastomer (B) in [wt %], based on the total weight of propylene copolymer composition.

3. The propylene copolymer composition according to claim 1, having a melt flow rate MFR$_2$ of 0.3 to 10.0 g/10 min, determined according to ISO 1133 at a temperature of 230° C. and a load of 2.16 kg.

4. The propylene copolymer composition according to claim 1, wherein the heterophasic propylene copolymer (A) has a flexural modulus of from 130 MPa to 380 MPa.

5. The propylene copolymer composition according to claim 1, wherein the propylene based plastomer (B) is a random propylene-ethylene plastomer.

6. The propylene copolymer composition according to claim 1, further comprising:
(C) from 5 to 25 wt %, based on the total amount of the propylene copolymer composition, of an ethylene based plastomer having a density in the range of from 850 to 900 kg/m³, determined according to ISO 1183D on compression moulded test specimens and a melt flow rate MFR$_2$ of 0.5 to 30.0 g/10 min, determined according to ISO 1133 at a temperature of 190° C. and a load of 2.16 kg, wherein the ethylene based plastomer (C).

7. The propylene copolymer composition according to claim 6, having a strain hardening factor, measured at a strain rate of 10 s$^{-1}$ and a Hencky strain of 2.5 (SHF e10) of at least 1.15 up to 3.00 and/or a strain hardening factor, measured at a strain rate of 5 s$^{-1}$ and a Hencky strain of 2.5 (SHF e5) of at least 1.05 up to 2.60.

8. The propylene copolymer composition according to claim 6, having a Large Amplitude Oscillatory Shear Non Linear Factor at a strain of 1000%, LAOS$_{NLF}$ (1000%), of from 1.5 to 5.0, and/or a Large Amplitude Oscillatory Shear Non Linear Factor at a strain of 500%, $LAOS_{NLF}$ (500%), of from 2.0 to 6.0.

9. The propylene copolymer composition according to claim 1, further comprising:

(D) from 0.5 to 5.0 wt %, based on the total amount of the propylene copolymer composition, of a propylene based plastomer having a density in the range of from 875 to 900 kg/m$^3$, determined according to ASTM D1505 on compression moulded test specimens.

10. The propylene copolymer composition according to claim 7, wherein the propylene based plastomer (D) is a random propylene-ethylene plastomer.

11. The propylene copolymer composition according to claim 1, having a Charpy notched impact strength, determined according to ISO 179/1eA at −40° C., of at least 1.9 KJ/m$^2$ up to 6.0 KJ/m$^2$.

12. The propylene copolymer composition according to claim 1, having a fogging gravimetric of from 0.00 to not more than 0.15 mg determined according to DIN 75201 method B.

13. An article comprising the propylene copolymer composition according to claim 1.

14. The article according to claim 13, being a car upholstery or a single ply roofing membrane.

15. The article according to claim 14, whereby the single ply roofing membrane is composed of:
   i) a top layer,
   ii) a bottom layer, and
   iii) optionally a scrim layer,
   wherein either layer i) or ii) or both layers i) and ii) comprise the propylene copolymer composition according to claim 1.

* * * * *